Sept. 18, 1928. F. A. KOLSTER ET AL Re. 17,086

ELECTROMAGNETIC SOUND REPRODUCER

2 Sheets-Sheet 1

Original Filed Jan. 18, 1927

Inventors
F. A. Kolster,
S. A. Sollie,
BY John C. Grady
ATTORNEY.

Sept. 18, 1928. F. A. KOLSTER ET AL Re. 17,086

ELECTROMAGNETIC SOUND REPRODUCER

2 Sheets-Sheet 2

Original Filed Jan. 18, 1927

Inventors
F. A. Kolster,
S. A. Sollie,
BY John B. Brady
ATTORNEY.

Reissued Sept. 18, 1928.

Re. 17,086

UNITED STATES PATENT OFFICE.

FREDERICK A. KOLSTER AND SIGURD A. SOLLIE, OF PALO ALTO, CALIFORNIA, ASSIGNORS TO FEDERAL TELEGRAPH COMPANY, OF SAN FRANCISCO, CALIFORNIA, A CORPORATION OF CALIFORNIA.

ELECTROMAGNETIC SOUND REPRODUCER.

Original No. 1,637,119, dated July 26, 1927, Serial No. 161,824, filed January 18, 1927. Application for reissue filed November 5, 1927. Serial No. 231,373.

This invention relates broadly to electromagnetic sound reproducers and more particularly to an electromagnetic sound reproducer which employs a free edge sound reproducing diaphragm.

One of the objects of the invention is to provide a practical construction of free edge sound reproducing diaphragm wherein mechanical vibrations may be imparted to the cone shaped sound reproducing diaphragm where the diaphragm is suspended intermediate the apex and peripheral edge thereof.

Another object of the invention is to provide an arrangement of conical shaped sound reproducing diaphragm and electromagnetic driver for imparting vibrations thereto where the cone shaped diaphragm is supported intermediate its apex and peripheral edge by a flexible membrane which is arranged to center the diaphragm with respect to the electromagnetic driver while permitting free movement of the diaphragm.

Still another object of our invention is to provide a pneumatic cushioning means for a free edge sound reproducing diaphragm for eleminating the tendency of blasting of the free edge of the diaphragm.

Figure 1:
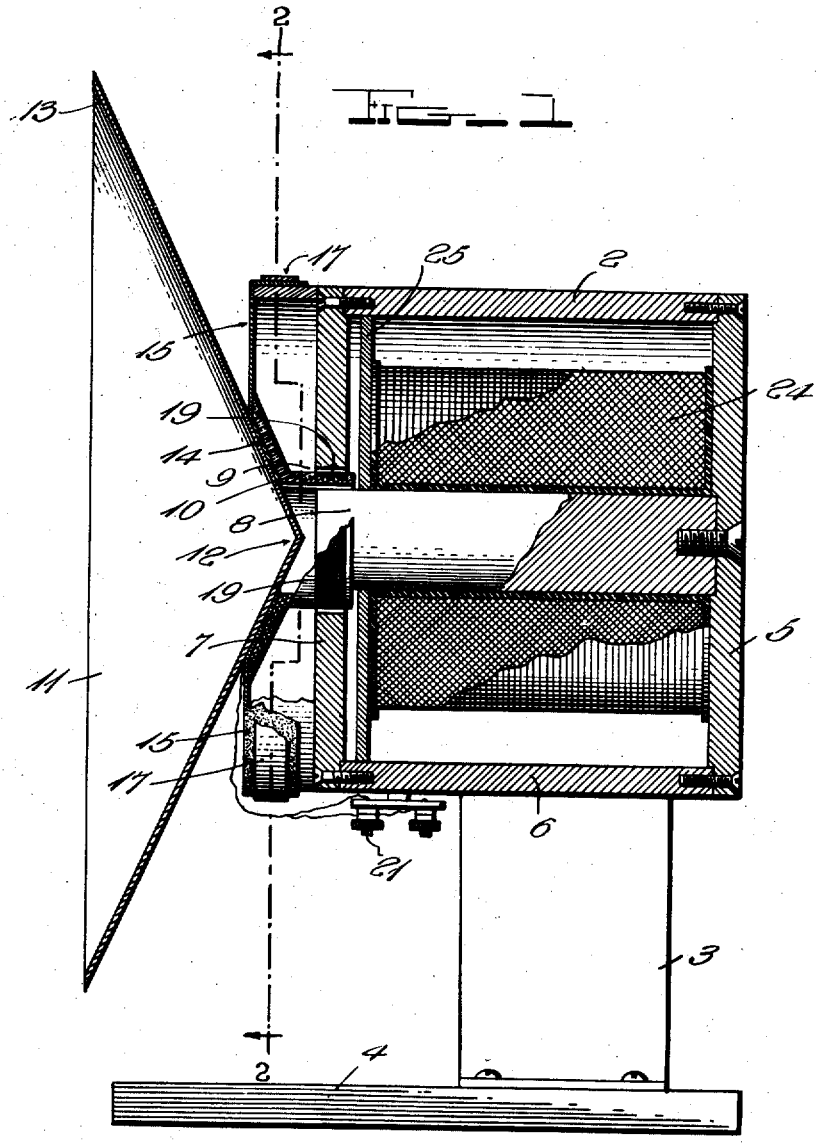
Figure 2:
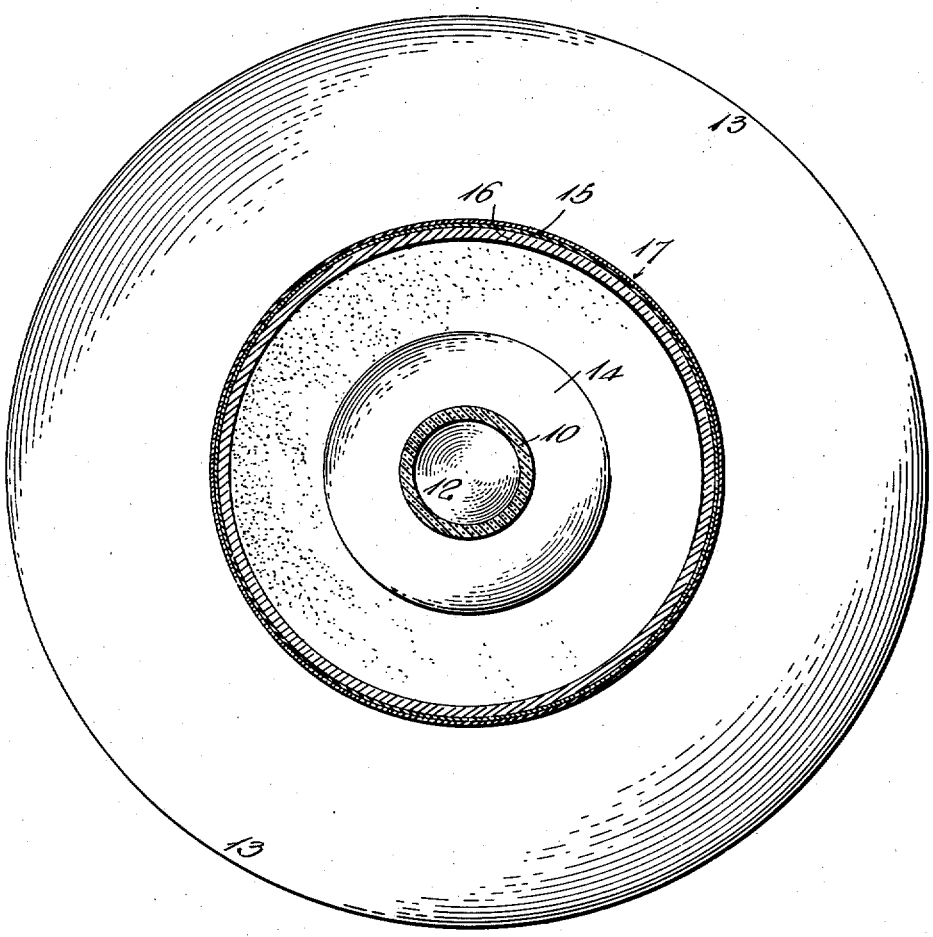

The invention will be more clearly understood by reference to the following specification and the accompanying drawings, wherein:

Figure 1 is a side elevation partially in cross-section of the electromagnetic driving mechanism and the conical shaped sound reproducing diaphragm mounting constituting the invention; and Fig. 2 is a cross-sectional view taken on line 2—2 of Fig. 1.

Heretofore in the art it has been proposed to rigidly mount a conical shaped sound reproducing diaphragm of the cone type from a spring rim at its periphery and move the diaphragm bodily from the apex thereof on the principle of a plunger. Such diaphragms have been of relatively large size and more than nine inches in diameter in order to develop sustained sound waves in unconfined air. The present invention is directed to a relatively small size cone shaped sound reproducing diaphragm in association with a driver of the electrodynamic type which has been found to be very effective in the reproduction of the entire range of musical notes encountered in radio broadcast reception.

The cone shaped diaphragm is free at its periphery and at the apex thereof but is supported intermediate the apex and peripheral edge. An armature winding is carried by the cone shaped sound reproducing diaphragm and this winding normally floats within a magnetic gap between the pole faces of the electromagnetic system. The cone is wholly supported intermediate the apex and the peripheral edge thereof so that the free edge normally floats without a peripheral support.

Referring to the drawings in detail, reference character 1 designates the electromagnetic driving mechanism enclosed in a housing 2. The electromagnetic driving mechanism is carried by supporting bracket 3 which protrudes from the base member 4. The electromagnetic driving mechanism is of the electrodynamic type in which a magnetic circuit is provided through the shell frame 5, 6 and 7, and through the magnetic pole member 8 which protrudes through the shell closure 7 forming an annular magnetic gap 9 in which the cylindrical bobbin 10 is arranged to float. The cylindrical bobbin 10 is secured to the surface of the conical shaped sound reproducing diaphragm 11 intermediate the apex 12 and the periphery 13 of the cone shaped diaphragm. The cylindrical bobbin 10 is flared outwardly as represented at 14 to conform with the shape of the sound reproducing diaphragm 11. The sound reproducing diaphragm 11 is suspended intermediate the apex 12 and the free peripheral edge 13 by flexible means 15 which may extend from the supporting member 16. The supporting member 16 is in the form of a ring over which a similar ring member 17 is arranged to slide for gripping flexible material such as leather therebetween. The flexible material 15 may be leather, rubber, linen or other sheet-like material or a plurality of cords which extend beneath the outwardly flared portion 14 of the bobbin 10. The bobbin 10 and material 15 are secured in the form of laminated layers to the surface of the cone shaped diaphragm 11 thereby suspending the cone shaped diaphragm for movement with respect to the electromagnetic driving mechanism from a position intermediate the apex and the free edge of the cone. The flexible membrane or material 15 which is stretched from the frame members 16 and 17 provides one wall of a substantially closed chamber or air pocket against which the diaphragm operates. This air pocket provides means for pneumatically damping the diaphragm for preventing blasting or free vibration of the cone. The only escape for the air is through the annular gap 9 so that it will be noted that the air is partially, if not almost wholly confined within the chamber.

The bobbin 10 carries an armature coil 19 thereon in the magnetic gap 9. Variable currents from the output circuit of an audio frequency amplification system are passed through the conductors 20 which connect with terminal posts 21 on the frame of the apparatus as represented at 22. The conductors 20 are normally so small in size and light in weight that they may be glued to the surface of the cone shaped diaphragm 11 without impeding the motion of the diaphragm.

A magnetic field is developed by means of field coil 24 which is wound upon the magnetic member 8 and supplied with power from any suitable source such as a rectifying system which may operate from the usual alternating current lighting circuit in the home.

In order that the response curve of the reproducer may be relatively flat without undesired sharp resonances, we provide a metallic disc 25 adjacent the electromagnetic system for introducing such eddy current fields as will react with the normal fields of the winding 19 produced at certain frequencies to render the operation of the apparatus more uniform.

We have illustrated the invention as applied to a conical shaped sound reproducing diaphragm, but it will be understood that a flat or other shape of diaphragm may be used equally well.

While we have illustrated our invention as applied to an electromagnetic driver of the electrodynamic type driving a cone having a free edge, we may employ our invention with other types of driver driving a cone, the edge of which is not free.

We have described our invention in certain preferred embodiments but we desire it to be understood that modifications may be made and that no limitations upon our invention are intended other than are imposed by the scope of the appended claims.

What we claim as new and desire to secure by Letters Patent of the United States is as follows:

1. An electromagnetic sound reproducer comprising an electromagnetic driver, a conical shaped sound reproducing diaphragm, a frame member surrounding the apex portion of said conical shaped sound reproducing diaphragm, and a flexible sheet of material secured at its edge to said frame member and extending along a portion of the convex side of said conical shaped sound reproducing diaphragm in a position intermediate the apex and peripheral edge thereof for suspending said conical shaped sound reproducing diaphragm for actuation by said electromagnetic driver.

2. An electromagnetic sound reproducer comprising a frame structure, an electromagnetic driver supported on said frame structure, said driver including a magnetic gap, an armature coil support disposed in said gap, a winding carried by said armature coil support, a conical shaped sound reproducing diaphragm arranged to carry said coil support, means for flexibly suspending said conical shaped sound reproducing diaphragm in a position intermediate the apex and free peripheral edge thereof, and an annular metallic plate disposed adjacent said electromagnetic driver for broadening the response curve of said electromagnetic sound reproducer.

3. An electromagnetic sound reproducer comprising an electromagnetic driving mechanism, a sound reproducing diaphragm, said sound reproducing diaphragm being connected with said electromagnetic driving mechanism, and a flexible membrane supporting said diaphragm in a position intermediate the apex and peripheral edge thereof, said flexible membrane forming a closure for an air chamber directly adjacent the sound reproducing diaphragm.

4. An electromagnetic sound reproducer comprising an electrodynamic driver including an armature winding and a field magnet, a sound reproducing diaphragm connected with said armature winding, a flexible membrane for supporting said sound reproducing diaphragm intermediate the apex and free peripheral edge thereof, said flexible membrane being stretched, across the front of said field magnet and forming an air chamber against which said sound reproducing diaphragm is arranged to operate.

5. An electromagnetic sound reproducer comprising a frame structure, an electrodynamic driving apparatus including a field magnet and an armature winding, a conical shaped sound reproducing diaphragm arranged to carry said armature winding, a cylindrical frame member extending from said electrodynamic driving apparatus to a position intermediate the apex and free peripheral edge of said diaphragm, and a flexible membrane stretched across said cylindrical frame and connected with said sound reproducing diaphragm intermediate the apex and free peripheral edge thereof for forming an air chamber adjacent said electrodynamic driving apparatus.

6. A sound reproducer comprising a cone, an annular flexible member having its inner periphery secured to said cone in continuous engagement therewith, and intermediate the apex and edge thereof, means for supporting said member, and means for driving said cone.

7. A device of the class described comprising an electromagnet having an annular casing of magnetic material forming an inwardly extending pole, a core member within the casing and spaced from said pole by an annular gap, a field winding within the casing, an armature winding in said gap, flexible vibratory means without the casing and associated with the armature coil to be vibrated thereby, supporting means for the vibratory means forming therewith a substantially confined chamber for a retarding medium between the vibratory means and electromagnet, the only outlet to said chamber being through the annular gap which is sufficiently small to offer substantial resistance to appreciable flow of the retarding medium therethrough.

In testimony whereof we affix our signatures.

FREDERICK A. KOLSTER.
SIGURD A. SOLLIE.